(12) United States Patent
Wang et al.

(10) Patent No.: US 12,363,008 B2
(45) Date of Patent: Jul. 15, 2025

(54) CONFIGURATION METHOD AND APPARATUS FOR VIRTUAL NETWORK INTERFACE CARD RESOURCE, AND COMPUTER DEVICE AND MEDIUM

(71) Applicant: SUZHOU METABRAIN INTELLIGENT TECHNOLOGY CO., LTD., Jiangsu (CN)

(72) Inventors: Wenxiao Wang, Jiangsu (CN); Pei Chen, Jiangsu (CN); Dekui Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/697,334

(22) PCT Filed: Nov. 16, 2022

(86) PCT No.: PCT/CN2022/132148
§ 371 (c)(1),
(2) Date: Mar. 29, 2024

(87) PCT Pub. No.: WO2023/160033
PCT Pub. Date: Aug. 31, 2023

(65) Prior Publication Data
US 2024/0406076 A1    Dec. 5, 2024

(30) Foreign Application Priority Data
Feb. 28, 2022    (CN) .......................... 202210183411.3

(51) Int. Cl.
H04L 41/40    (2022.01)
H04L 41/0895    (2022.01)

(52) U.S. Cl.
CPC .......... *H04L 41/40* (2022.05); *H04L 41/0895* (2022.05)

(58) Field of Classification Search
CPC ....................................................... H04L 41/40
(Continued)

(56) References Cited

U.S. PATENT DOCUMENTS 9,898,317 B2 * 2/2018 Nakil ...................... H04L 43/10
2011/0093251 A1   4/2011 Belgaied et al.
(Continued)

FOREIGN PATENT DOCUMENTS

CN    104168135 A    11/2014
CN    104468311 A    3/2015
(Continued)

OTHER PUBLICATIONS

Chinese Search Report received for CN Application No. 2022101834113 on Apr. 19, 2022, 2 pgs.
(Continued)

*Primary Examiner* — Asad M Nawaz
(74) *Attorney, Agent, or Firm* — Merchant & Gould P.C.

(57) ABSTRACT

The present disclosure provides a configuration method for virtual network interface card resource, including: integrating a plurality of virtual network interface cards in a node where a container group is located, so as to obtain a virtual network interface card set including a plurality of virtual network interface card groups; assigning a target virtual network interface card group for the container group from the virtual network interface card set; analyzing the target virtual network interface card group to obtain address information of target virtual network interface cards in the target virtual network interface card group; and configuring a virtual network interface card resource for the container group according to the address information.

19 Claims, 4 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2012/0278599 | A1* | 11/2012 | Nilakantan | H04L 67/34 713/2 |
| 2017/0012886 | A1* | 1/2017 | Birke | H04L 47/12 |
| 2020/0036774 | A1* | 1/2020 | Tada | G06F 9/541 |
| 2025/0140374 | A1* | 5/2025 | Fortkort | G16H 50/20 |

FOREIGN PATENT DOCUMENTS

| | | | | |
|---|---|---|---|---|
| CN | 105430110 | A | | 3/2016 |
| CN | 106060122 | A | | 10/2016 |
| CN | 107666446 | A | | 2/2018 |
| CN | 107678836 | A | | 2/2018 |
| CN | 109587281 | A | | 4/2019 |
| CN | 110138606 | A | | 8/2019 |
| CN | 111314450 | A * | 6/2020 | ......... H04L 67/1023 |
| CN | 112925581 | A | | 6/2021 |
| CN | 113535319 | A | | 10/2021 |
| CN | 113746676 | A | | 12/2021 |
| CN | 114244717 | A | | 3/2022 |
| WO | 2017198035 | A1 | | 11/2017 |
| WO | WO-2019237584 | A1 * | 12/2019 | ........... G06F 13/128 |
| WO | 2023160033 | A1 | | 8/2023 |

OTHER PUBLICATIONS

Chinese Search Report received for CN Application No. 2022101834113 on Mar. 29, 2022, 2 pgs.
Chen et al., "Application Technique of Virtual Multiple Network Card," Computer & Digital Engineering No. 5 pp. 18-21 (2002).
International Search Report and Written Opinion for International Application No. PCT/CN2022/132148 mailed Jan. 17, 2023 with English translation of Search Report.
ZTE, "Generic NRM for virtual network," 3GPPTSGSA WG5 (Telecom Management) Meeting #101 S5-153129 (May 15, 2015).

* cited by examiner

CONFIGURATION METHOD AND APPARATUS FOR VIRTUAL NETWORK INTERFACE CARD RESOURCE, AND COMPUTER DEVICE AND MEDIUM

CROSS-REFERENCE TO RELATED APPLICATION

This present application is a National Stage Application of International Application No. PCT/CN2022/132148, filed Nov. 16, 2022, which claims priority to Chinese Patent Application No. 202210183411.3 filed with the China National Intellectual Property Administration (CNIPA) on Feb. 28, 2022 and entitled "Configuration method for virtual network interface card resource and Apparatus, and Computer Device and Medium", the disclosure of which is hereby incorporated by reference in its entirety. To the extent appropriate, a claim of priority is made to each of the above disclosed applications.

TECHNICAL FIELD

The present disclosure relates to a configuration method and apparatus for virtual network interface card resource, a computer device and a medium.

BACKGROUND

With the gradual implementation of a container technology in enterprise production, requirements of users for network characteristics of container cloud are getting higher and higher. Therefore, a kubernetes technology merges as the times require, and abstract, decoupling, high-scalability, unified scheduling, and centralized management of services are realized. Kubernetes is an open source container orchestration engine, which is used to automatically deploy, scale, and manage containerized applications. Pod is the smallest scheduling unit that may be scheduled in Kubernetes, and the Pod may be understood as a container group including at least one container.

In a Kubernetes cluster, the container group may be subjected to communication access or data interaction with other container groups based on a loaded virtual network interface card. In the related art, virtual network interface card resources loaded by the container group are virtual network interface cards that are determined, in advance, to be assigned to the container group through manual comparison and screening one by one from a plurality of virtual network interface cards in a node where the container group is located, so as to configure same to the container group, for the container group to load.

The inventors realized that, by using the method above to configure the virtual network interface card for the container group, low configuration efficiency is caused due to the need for manual screening. Furthermore, when the container group needs to load the plurality of virtual network interface cards, a lot of configuration time needs to be consumed, resulting in high time cost, and thus affecting the loading efficiency of virtual network interface card resources.

SUMMARY

The present disclosure provides a configuration method and apparatus for virtual network interface card resource, a computer device and a medium according to various embodiments disclosed in the present disclosure.

A configuration method for virtual network interface card resource includes the following operations.

A plurality of virtual network interface cards in a node where a container group is located are integrated, so as to obtain a virtual network interface card set including a plurality of virtual network interface card groups.

A target virtual network interface card group is assigned for the container group from the virtual network interface card set.

The target virtual network interface card group is analyzed to obtain address information of target virtual network interface cards in the target virtual network interface card group.

A virtual network interface card resource is configured for the container group according to the address information.

A configuration apparatus for virtual network interface card resource includes an acquisition unit, an assignment unit, an analysis unit, and a configuration unit.

The acquisition unit is configured to integrate a plurality of virtual network interface cards in a node where a container group is located, so as to obtain a virtual network interface card set including a plurality of virtual network interface card groups.

The assignment unit is configured to assign a target virtual network interface card group for the container group from the virtual network interface card set.

The analysis unit is configured to analyze the target virtual network interface card group to obtain address information of target virtual network interface cards in the target virtual network interface card group.

The configuration unit is configured to configure a virtual network interface card resource for the container group according to the address information.

A computer device includes a memory and one or more processors. The memory and the processor are communicatively connected to each other. The memory stores a computer-readable instruction. The one or more processors, by executing the computer-readable instruction, execute operations of the configuration method for virtual network interface card resource described in any one of the above.

A non-transitory computer-readable storage medium stores a computer-readable instruction. The computer-readable instruction is used for enabling a computer to execute operations of the configuration method for virtual network interface card resource described in any one of the above.

The details of one or more embodiments of the present disclosure are set forth in the drawings and the description below. Other features and advantages of the present disclosure will be apparent from the drawings and the claims from the specification.

BRIEF DESCRIPTION OF THE DRAWINGS

In order to more clearly illustrate the specific implementations of the present disclosure or the technical solutions in the related art, the drawings used in the description of the specific implementations or the related art will be briefly described below. It is apparent that the drawings in the following descriptions are some implementations of the present disclosure. Other drawings may be obtained from those skilled in the art according to these drawings without any creative work.

DETAILED DESCRIPTION OF THE EMBODIMENTS

The technical solutions of the present disclosure will be clearly and completely described below with reference to the drawings. It is apparent that the described embodiments are merely part of the embodiments of the present disclosure, not all the embodiments. All other embodiments obtained by those of ordinary skill in the art on the basis of the embodiments in the present disclosure without creative work all fall within the scope of protection of the present disclosure.

In the related art, virtual network interface card resources loaded by the container group corresponding to virtual network interface cards that are determined, in advance, to be assigned to the container group through manual comparison and screening one by one from a plurality of virtual network interface cards in a node where the container group is located, so as to configure the determined virtual network interface cards to the container group, for the container group to load. However, the virtual network interface card is configured based on manual work, resulting in low configuration efficiency of the virtual network interface card. When the container group needs to load a plurality of virtual network interface cards, when the above method is still used to configure a virtual network interface card resource for the container group, a lot of configuration time needs to be consumed, resulting in high time cost, and thus affecting the loading efficiency of virtual network interface card resources.

In order to solve the above problem, an embodiment of the present disclosure provides a configuration method for virtual network interface card resource, which is used in a computer device. It is to be noted that, an execution subject of the method may be a virtual network interface card resource configuration apparatus. The apparatus may be implemented as part of all of a computer device by means of software, hardware, or a combination of the software and the hardware. The computer device may be a terminal or a client or a server. The server may be a server or a server cluster composed of a plurality of servers. The terminal in the embodiments of the present disclosure may be other intelligent hardware devices such as a smart phone, a personal computer, a tablet computer, a wearable device, and an intelligent robot. In the following method embodiments, the execution subject being the computer device is used as an example for description.

The computer device of this embodiment may be one of the nodes (hosts) in the deployed kubernetes cluster, and the computer device includes at least one physical network interface card, so as to provide a network environment for each container group in the kubernetes cluster. The physical network interface card may be a Single Root I/O Virtualization (sriov) network interface card, such that a plurality of lightweight physical devices using a Peripheral Component Interconnect express (PCI-e) protocol may be virtualized by the physical network interface card, so as to obtain the plurality of virtual network interface cards.

The configuration method for virtual network interface card resource provided in the present disclosure is suitable for an application scenario where the container group loads the plurality of virtual network interface card resources. By means of the configuration method for virtual network interface card resource provided in the present disclosure, the plurality of virtual network interface cards in the node where the container group is located may be integrated in advance, so as to obtain the virtual network interface card set including a plurality of virtual network interface card groups, such that, when the virtual network interface card resource is configured for the container group, a target virtual network interface card may be assigned for the container group on a group basis, and the container group may rapidly acquire the virtual network interface card resource. Therefore, while the configuration efficiency is improved, manual intervention is avoided or reduced, thereby enabling a configuration process of the virtual network interface card resource to be more convenient and intelligent.

Figure 1:
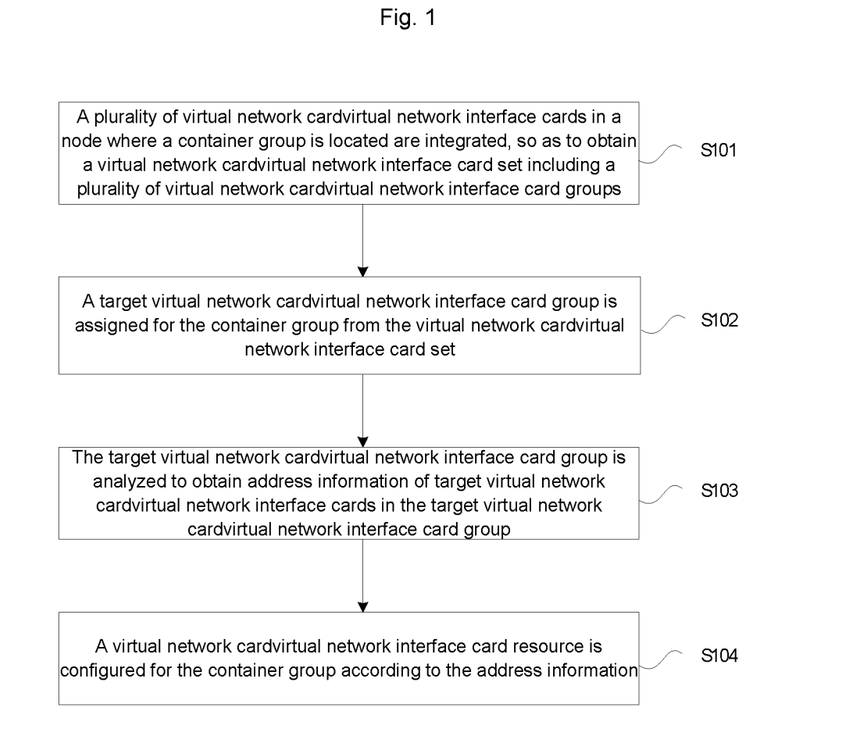
FIG. 1 is a flowchart of a configuration method for virtual network interface card resource according to one or more embodiments.

FIG. 1 is a flowchart of a configuration method for virtual network interface card resource according to one or more embodiments. As shown in FIG. 1, the configuration method for virtual network interface card resource includes S101 to S104.

In S101, a plurality of virtual network interface cards in a node where a container group is located are integrated, so as to obtain a virtual network interface card set including a plurality of virtual network interface card groups.

In the embodiments of the present disclosure, the node where the container group is located includes the plurality of virtual network interface cards. In order to conveniently assign the virtual network interface card resources and improve assignment efficiency, the plurality of virtual network interface cards are integrated. The plurality of virtual network interface cards are integrated together in the form of a group to obtain a plurality of virtual network interface card groups, such that when virtual resource configuration is performed subsequently, the virtual network interface cards may be rapidly configured in the form of the group, so as to rapidly assign the plurality of virtual network interface cards for the container group, thereby achieving the purpose of shortening configuration time and improving configuration efficiency.

In one or more embodiments, some virtual network interface cards in the virtual network interface card group correspond to the same physical network interface card in the node. In another one or more embodiments, the virtual network interface cards in the virtual network interface card group respectively correspond to different physical network interface cards in the node, such that, when the virtual network interface card resource is subsequently configured, physical network interface card resources may be fully and evenly utilized.

In S102, a target virtual network interface card group is assigned for the container group from the virtual network interface card set.

In the embodiments of the present disclosure, the target virtual network interface card group may be any one of virtual network interface card groups to be configured in the virtual network interface card set, such that the plurality of container groups are prevented from sharing the same target virtual network interface card group.

In one or more embodiments, the target virtual network interface card group may be assigned for the container group according to the virtual network interface card resource requirement of the container group. In a process of creating the container group, the virtual network interface card resource requirement of the container group may be written to a preset configuration file (a configuration file in a yaml format) of the container group, such that the target virtual network interface card group required by the container group may be clearly determined when the virtual network interface card resource is applied to the Kubernetes cluster to create the container group. In one or more embodiments, the number of the configured virtual network interface card groups is 1 by default.

In another one or more embodiments, in order to conveniently assign the target virtual network interface card group, after the virtual network interface card groups are integrated, identifiers of the virtual network interface card groups may be created and stored, such that the Kubernetes cluster may determine, through the identifiers, the target virtual network interface card group to be assigned. For example, the name of the virtual network interface card set is represented by sriov_netdevice, and the virtual container groups use Arabic numerals to replace the identifiers, for example, identifiers 0, 1, 2, and 3 respectively represent 4 different virtual container groups. Therefore, when the preset configuration file of the container group is constructed, "sriov_netdevice: 1" may be configured in virtual network interface card resource limitation (spec-containers-resources) in the kubernetes cluster, so as to, when the container group is constructed, apply, to the Kubernetes cluster, the virtual network interface card group with the identifier being 1 as the target virtual network interface card group of the container group.

In S103, the target virtual network interface card group is analyzed to obtain address information of target virtual network interface cards in the target virtual network interface card group.

In the embodiments of the present disclosure, during the assignment of the virtual network interface card resources, the target virtual network interface cards are assigned to the container group in the form of the target virtual network interface card group, such that, in order to clear the address information of the target virtual network interface cards, the target virtual network interface card group is analyzed, so as to be able to perform targeted configuration through the address information of the target virtual network interface cards when the virtual network interface card resources of the target virtual network interface cards are configured for the container group.

In S104, a virtual network interface card resource is configured for the container group according to the address information.

In the embodiments of the present disclosure, the positions of the target virtual network interface cards are clearly determined according to the address information of the target virtual network interface cards, such that targeted configuration may be performed when the virtual network interface card resources are configured for the container group, thereby improving configuration efficiency and accuracy.

By means of the above embodiments, the plurality of virtual network interface cards in the node where the container group is located may be integrated in advance, so as to obtain the virtual network interface card set including a plurality of virtual network interface card groups, such that, when the virtual network interface card resource is configured for the container group, a target virtual network interface card may be assigned for the container group on a group basis, and the container group may rapidly acquire the virtual network interface card resource. Therefore, while the configuration efficiency is improved, manual intervention is avoided or reduced, thereby enabling a configuration process of the virtual network interface card resource to be more convenient and intelligent.

A virtual network interface card set acquisition process is described in detail by the following embodiments.

Figure 2:
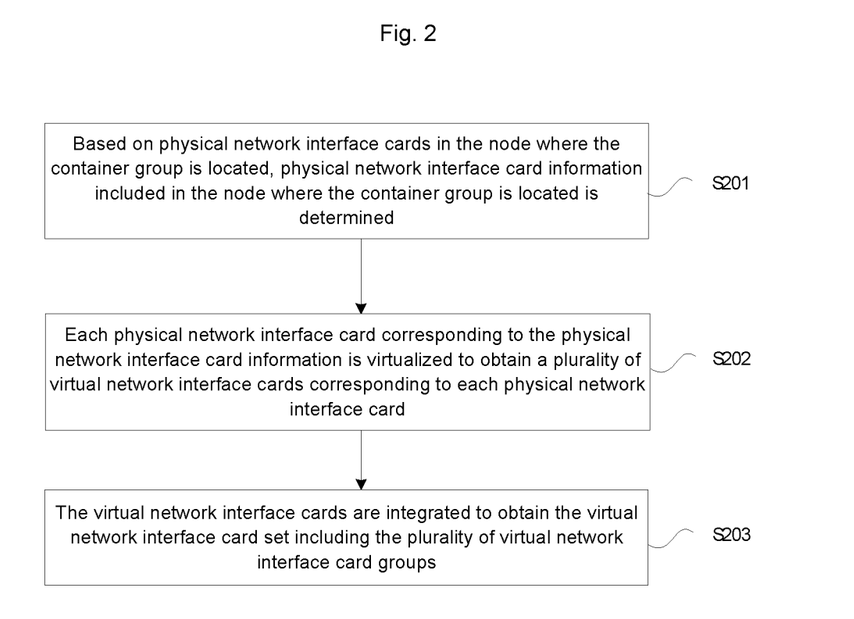
FIG. 2 is a flowchart of a acquisition method for virtual network interface card set according to one or more embodiments.

FIG. 2 is a flowchart of a acquisition method for virtual network interface card set according to one or more embodiments. As shown in FIG. 2, the acquisition method for virtual network interface card set includes the following operations.

In S201, based on physical network interface cards in the node where the container group is located, physical network interface card information included in the node where the container group is located is determined.

In the embodiments of the present disclosure, the virtual network interface card resource is a network interface card resource that is obtained by virtualizing the physical network interface cards, such that, in order to rationally utilize resources of the physical network interface cards, the physical network interface card information included in the current node is determined, so as to clearly determine, through the physical network interface card information, the number of the physical network interface cards included in the node.

In S202, each physical network interface card corresponding to the physical network interface card information is virtualized to obtain a plurality of virtual network interface cards corresponding to each physical network interface card.

In the embodiments of the present disclosure, in order to fully utilize the network interface card resources provided by the physical network interface cards, the number of the container groups in the kubernetes cluster is not unique. Therefore, each physical network interface card included in the physical network interface card information is virtualized to obtain the plurality of virtual network interface cards corresponding to each physical network interface card, such that the container groups in the node may all obtain enough virtual network interface card resources. The number of the virtual network interface cards corresponding to each physical network interface card is the same.

In S203, the virtual network interface cards are integrated to obtain the virtual network interface card set including the plurality of virtual network interface card groups.

In the embodiments of the present disclosure, each virtual network interface card group includes the plurality of virtual network interface cards, and different virtual network interface cards correspond to different physical network interface cards. The virtual network interface cards in the virtual network interface card group are integrated according to different physical network interface cards, such that the network interface card resources of the physical network interface cards may be fully utilized when the virtual network interface card group is assigned.

By means of the above embodiments, the physical network interface cards corresponding to the virtual network interface cards are integrated when the virtual network interface card groups are integrated, such that the network interface card resources of the physical network interface cards may be fully utilized when the virtual network interface card group is assigned.

In one or more embodiments, the virtual network interface cards in the same virtual network interface card group respectively correspond to different physical network interface cards. In order to prevent the physical network interface cards corresponding to the virtual network interface cards from being unable to be distinguished when the virtual network interface card groups are integrated, causing repeat selection of the virtual network interface cards corresponding to the same physical network interface card, during the process of integrating the virtual network interface cards, the source of the virtual network interface cards is clearly determined by establishing a correspondence relationship between the network segment and the virtual network interface card, thereby improving the integration accuracy of the virtual network interface card groups for subsequent rational utilization of the network interface card resources.

Specifically, the physical network interface card information includes the number of network interface cards of the physical network interface cards in the node, such that the number of network interface cards may be clearly determined through the physical network interface card information. The same number of network segments as the number of the physical network interface cards is determined according to the number of network interface cards. That is, the number of the network segments is the same as the number of the physical network interface cards, such that the physical network interface cards corresponding to the virtual network interface cards may be distinguished through the network segments when the correspondence relationship between the virtual network interface card and the network segment is established. The network segments of the plurality of virtual network interface cards corresponding to the same physical network interface card are the same. Therefore, the virtual network interface cards with different network segments are integrated into the same virtual network interface card group to obtain the virtual network interface card set comprising the plurality of virtual network interface card groups.

Figure 3:
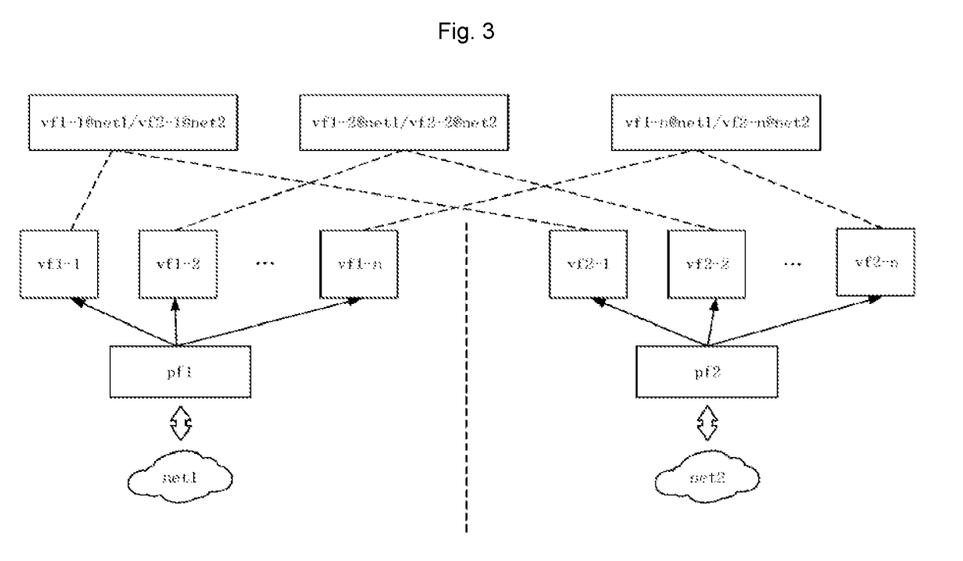
FIG. 3 is a schematic diagram of a process of integrating virtual network interface card groups according to one or more embodiments.

In one or more implementation scenarios, the integration process of the virtual network interface card groups may be shown in FIG. 3. FIG. 3 is a schematic diagram of a process of integrating virtual network interface card groups according to one or more embodiments. For ease of description, in the following, the physical network interface card is represented by pf, and the virtual network interface card is represented by vf. The network segment assigned to the physical network interface card 1 (pf1) is represented by net1, and the network segment assigned to the physical network interface card 2 (pf2) is represented by net2. A virtual graphics card obtained after the pf1 is virtualized is represented by pf1-n, where n≥1; and a virtual graphics card obtained after the pf2 is virtualized is represented by pf2-n, where n≥1.

According to the physical network interface card information, when two pfs included in the node are determined, the two network segments are classified to establish the correspondence relationship with vfs corresponding to the pfs. For example, a correspondence relationship between the vfs in net1 (12.0.0.0/24) and the pf1 is established, and a correspondence relationship between the vfs in net2 (13.0.0.0/24) and the pf2 is established. The correspondence relationship may be shown as follows: pf1: {vf1-1, vf1-2, . . . , vf1-n}—12.0.0.0/24 (net1), pf2: {vf1-1, vf1-2, . . . , vf1-n}—13.0.0.0/24 (net2). Therefore, the virtual network interface cards are integrated to obtain the virtual network interface card set including the plurality of virtual network interface card group: [vf1-1@net1/vf2-1@net2,vf1-2@net1/vf2-2@net2, . . . , vf1-n@net1/vf2-n@net2]. vf1-1@net1/vf2-1@net2, vf1-2@net1/vf2-2@net2 . . . vf1-n@net1/vf2-n@net2 respectively indicate the virtual network interface card group.

In one or more embodiments, since there is a correspondence relationship between each target virtual network interface card in the target virtual network interface card group and the network segment to rapidly position each target virtual network interface card, the target virtual network interface card group assigned to the container group is analyzed, and the plurality of target virtual network interface cards included in the target virtual network interface card group are determined, such that a target network segment corresponding to each target virtual network interface card is determined according to the correspondence relationship between the virtual network interface card and the network segment. Therefore, address information of each target virtual network interface card in the target virtual network interface card group is obtained according to the target virtual network interface cards and the target network segments corresponding to the target virtual network interface cards. For example, using vf1-1@net1/vf2-1@net2 being the target virtual network interface card group as an example, when the target virtual network interface card group is analyzed, the vf1-1@net1/vf2-1@net2 is segmented with "/" to obtain the target virtual network interface card vf1-1@net1 and the target virtual network interface card vf2-1@net2, so as to clearly determine the target network segments corresponding to the target virtual network interface cards, such that the address information of vf1-1 is obtained according to vf1-1@net1 and @net1, and the address information of vf1-2 is obtained according to vf2-1@net2 and @net2.

In another one or more embodiments, after the address information is determined, when the virtual network interface card resource is configured for the container group, network proxy configuration of the target virtual network interface cards may be constructed according to the address information, so as to configure the virtual network interface card resource for the container group through the network proxy configuration, thereby realizing rapid configuration of the virtual network interface card resources. In one or more implementation scenarios, the target virtual network interface card group is analyzed by a multus-Container Network Interface (multus-cni) component in the node, such that the virtual network interface card resource is configured for the container group at a bottom layer of the node by a sriov-cni plugin according to the address information of the target virtual network interface card.

Figure 4:
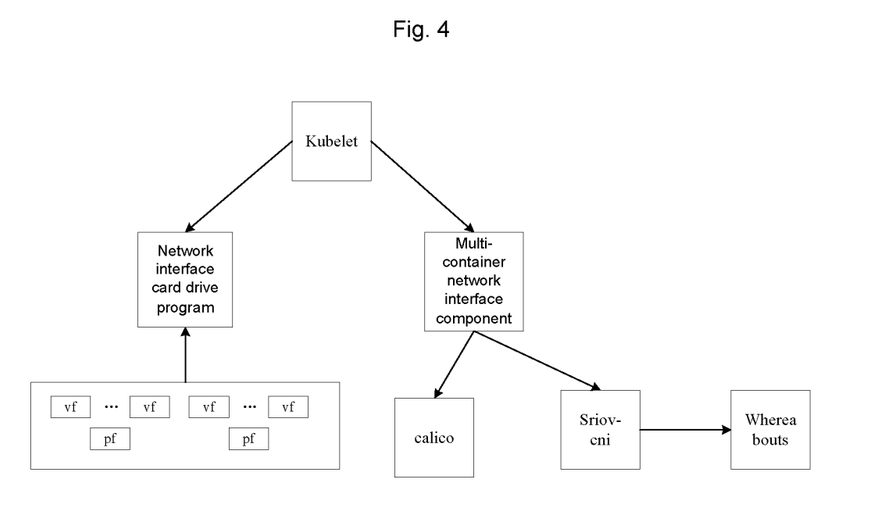
FIG. 4 is a flowchart of a configuration method for virtual network interface card resource according to another one or more embodiments.

In one or more implementation scenarios, the configuration method for virtual network interface card resource may be shown in FIG. 4. FIG. 4 is a flowchart of a configuration method for virtual network interface card resource according to another one or more embodiments.

The plurality of physical network interface cards included in the node are integrated in a network interface card drive program (sriov-device-plugin (sriov-dp)), and the physical network interface cards are virtualized to obtain the plurality of virtual network interface cards. The physical network interface cards and the plurality of virtual network interface cards corresponding to the physical network interface cards are bound and reported to kubelet (a node agent on the node for running a kubernetes cluster), and the target virtual network interface card group is assigned for the container group according to the virtual network interface card resource requirement in the preset configuration file of the container group. The target virtual network interface card group is analyzed by the multus-cni, and the target virtual network interface cards are determined, such that the virtual network interface card resource is configured for the container group at the bottom layer of the node by sriov-cni according to the address information of the target virtual network interface card. calico is a network plugin, and is used for providing a communication among a plurality of hosts for a virtual machine where the virtual network interface cards are located and the container group. Whereabouts is used for tracking a network source code.

In another one or more implementation scenarios, any one of the configuration method for virtual network interface card resources provided in the present disclosure may be suitable for performing deep learning training in the kubernetes cluster, and used in application scenarios where memory or data interaction is remotely directly accessed by using a Remote Direct Memory Access (rdma) technology.

Figure 5:
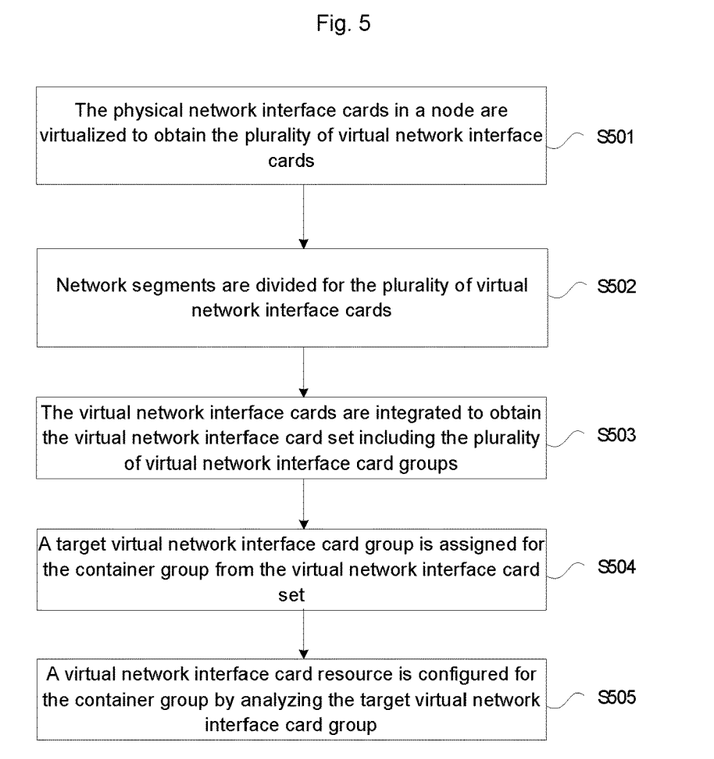
FIG. 5 is a flowchart of a configuration method for virtual network interface card resource according to still another one or more embodiments.

In still another one or more implementation scenarios, the configuration method for virtual network interface card resource may be shown in FIG. 5. FIG. 5 is a flowchart of a configuration method for virtual network interface card resource according to still another one or more embodiments.

In S501, the physical network interface cards in a node are virtualized to obtain the plurality of virtual network interface cards.

In the embodiments of the present disclosure, the number of the virtual network interface cards obtained by virtualizing the physical network interface cards is the same.

In one or more embodiments, when the kubernetes cluster includes a plurality of nodes, the nodes are traversed to determine physical network interface card information of the nodes, so as to clearly determine the number of physical network interface cards included in the nodes. For example, there are two physical network interface cards pf1 and pf2 on a node.

In S502, network segments are divided for the plurality of virtual network interface cards.

In the embodiments of the present disclosure, the same number of network segments as the network interface cards is determined according to the number of the network interface cards of the physical network interface cards in the node, such that a correspondence relationship between the plurality of virtual network interface cards divided for the same physical network interface card and the same network segment is established when the correspondence relationship between the virtual network interface card and the network segment is established. That is, the network segments of the plurality of virtual network interface cards corresponding to the same physical network interface card are the same, and the network segments of the plurality of virtual network interface cards corresponding to different physical network interface cards are different, such that the virtual network interface cards may be subsequently configured for the container group through the network segments.

In S503, the virtual network interface cards are integrated to obtain the virtual network interface card set including the plurality of virtual network interface card groups.

In the embodiments of the present disclosure, in order to make the kubernetes cluster recognize the virtual network interface card set to assign a target container group for the container group, the integrated virtual network interface cards are registered to the kubernetes cluster, and a resource name (for example, set as sriov_netdevice) of the virtual network interface card set is set, and virtual container groups use Arabic numerals to replace identifiers, such that the kubernetes cluster owns a plurality of virtual network interface card group resources. When the preset configuration file of the container group is constructed, "sriov_netdevice: 1" may be configured in virtual network interface card resource limitation (spec-containers-resources) in the kubernetes cluster, so as to, when the container group is constructed, apply, to the Kubernetes cluster, the virtual network interface card group with the identifier being 1 as the target virtual network interface card group of the container group.

In S504, a target virtual network interface card group is assigned for the container group from the virtual network interface card set.

In the embodiments of the present disclosure, when there is a container group in the kubernetes cluster requesting for the virtual network interface card resource requirement (e.g., requesting resources of a network interface card drive device (sriov_netdevice)), one virtual network interface card group is selected from sriov_netdevice that has been registered in the Kubernetes cluster as the target virtual network interface card group for assignment. For example, vf1-1@net1/vf2-1@net2 is used as the target virtual network interface card group.

In S505, a virtual network interface card resource is configured for the container group by analyzing the target virtual network interface card group.

In one or more implementation scenarios, by constructing a nccl environment variable of the container group, the nccl may configure communication environments of a plurality of Graphics Processing Units (GPU) through the plurality of target virtual network interface cards. The nccl is a short name for Nvidia Collective multi-GPU Communication Library. The environment variable is constructed based on the target virtual network interface card. For example, the environment variable is shown as follows: CONTAINER_NCCL_INFO=/etc/nccl.conf; and a content format in a nccl.conf file is NCCL_IB_HCA=vf1-1,vf2-1. In one or more embodiments, the number of constructed communication environments of the GPUs is the same as the number of the target virtual network interface cards, such that the communication efficiency of the GPU is improved, thereby facilitating the acceleration of deep learning training.

By means of the above embodiments, the virtual network interface card resources of the plurality of physical network interface cards are integrated and managed through abstraction of the physical network interface cards, such that the target virtual network interface cards of deep learning training may be bound to the environment variable of the container group to analyze the target virtual network interface card group in the multu-cni component, so as to configure the plurality of target virtual network interface cards to a container one by one, thereby improving the abstractness of service logic to achieve high-cohesion and low-coupling effects. Furthermore, redundant operations for configuring the virtual network interface card resources of the container groups in the kubernetes cluster are reduced.

Based on the same inventive concept, the present disclosure further provides a virtual network interface card resource configuration apparatus.

Figure 6:
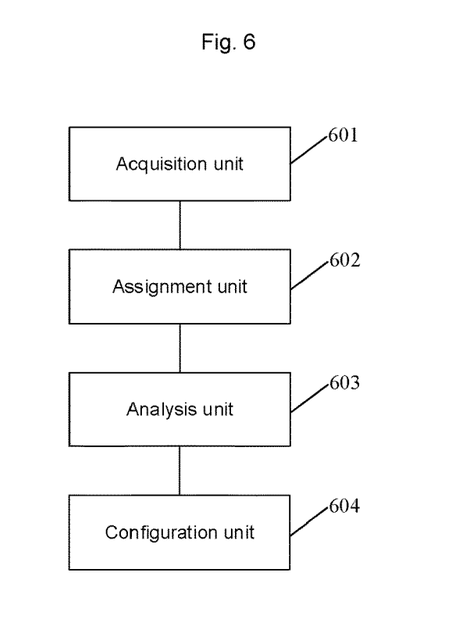
FIG. 6 is a structural block diagram of a virtual network interface card resource configuration apparatus according to one or more embodiments.

FIG. 6 is a structural block diagram of a virtual network interface card resource configuration apparatus according to one or more embodiments. As shown in FIG. 6, the virtual network interface card resource configuration apparatus includes an acquisition unit 601, an assignment unit 602, an analysis unit 603, and a configuration unit 604.

The acquisition unit 601 is configured to integrate a plurality of virtual network interface cards in a node where a container group is located, so as to obtain a virtual network interface card set including a plurality of virtual network interface card groups.

The assignment unit 602 is configured to assign a target virtual network interface card group for the container group from the virtual network interface card set.

The analysis unit 603 is configured to analyze the target virtual network interface card group to obtain address information of target virtual network interface cards in the target virtual network interface card group.

The configuration unit 604 is configured to configure a virtual network interface card resource for the container group according to the address information.

In one or more embodiments, the acquisition unit 601 includes a determination unit, configured to, based on physical network interface cards in the node where the container group is located, determine physical network interface card information included in the node where the container group is located; a virtualization unit, configured to virtualize each physical network interface card included in the physical network interface card information to obtain a plurality of virtual network interface cards corresponding to each physical network interface card; and an integration unit, configured to integrate the virtual network interface cards to obtain the virtual network interface card set including the plurality of virtual network interface card groups. Each virtual network interface card group includes the plurality of virtual network interface cards, and different virtual network interface cards correspond to different physical network interface cards.

In another one or more embodiments, the physical network interface card information includes the number of network interface cards of the physical network interface cards. The integration unit includes: a network segment determination unit, configured to determine the same number of network segments as the number of the physical network interface cards according to the number of network interface cards; a creation unit, configured to establish a correspondence relationship between the virtual network interface card and the network segment, where the network segments of the plurality of virtual network interface cards corresponding to the same physical network interface card are the same; and an integration sub-unit, configured to integrate the virtual network interface cards with different network segments into the same virtual network interface card group to obtain the virtual network interface card set including the plurality of virtual network interface card groups.

In still another one or more embodiments, the target virtual network interface card group includes a plurality of target virtual network interface cards. The analysis unit includes: a first analysis unit, configured to analyze the target virtual network interface card group, and determine the plurality of target virtual network interface cards included in the target virtual network interface card group; a second analysis unit, configured to determine a target network segment corresponding to each target virtual network interface card according to the correspondence relationship between the virtual network interface card and the network segment; and an address information acquisition unit, configured to obtain the address information of each target virtual network interface card in the target virtual network interface card group according to each target virtual network interface card and the target network segment corresponding to each target virtual network interface card.

In still another one or more embodiments, the configuration unit 604 includes: a construction unit, configured to respectively construct network proxy configuration of each target virtual network interface card according to the address information; and a configuration sub-unit, configured to configure the virtual network interface card resource for the container group according to the network proxy configuration.

In still another one or more embodiments, the apparatus further includes: a marking unit, configured to create and store an identifier of each virtual network interface card group, so as to determine, through the identifier, the target virtual network interface card group to be assigned.

In still another one or more embodiments, the assignment unit 602 includes: a requirement determination unit, configured to determine a virtual network interface card resource requirement of the container group according to a preset configuration file of the container group; and an assignment sub-unit, configured to assign the target virtual network interface card group for the container group from the virtual network interface card set according to the virtual network interface card resource requirement.

For the specific limitation and beneficial effects of the virtual network interface card resource configuration apparatus, refer to the limitation on the configuration method for virtual network interface card resource, and the details are not described herein again. Each module may be implemented entirely or partly by software, hardware, or a combination thereof. The foregoing modules may be embedded in or independent of a processor in a computer device in the form of hardware, or may be stored in a memory in the computer device in the form of software, such that the processor calls and executes the operations corresponding to the foregoing modules.

Figure 7:
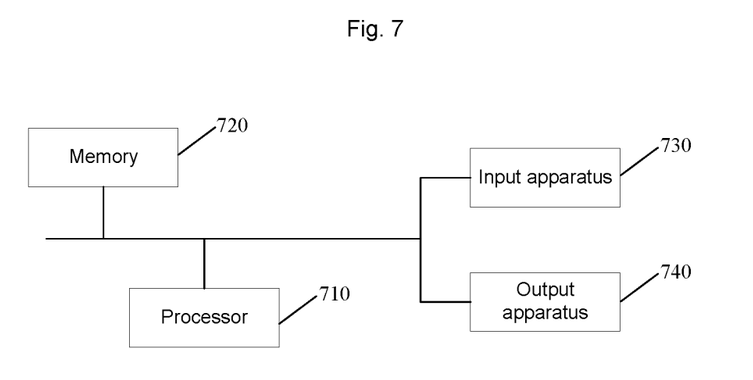
FIG. 7 is a schematic diagram of a hardware structure of a computer device according to one or more embodiments.

FIG. 7 is a schematic diagram of a hardware structure of a computer device according to one or more embodiments. As shown in FIG. 7, the device includes one or more processors 710 and a memory 720. The memory 720 includes a persistent memory, a volatile memory, and a hard disk. In FIG. 7, one processor 710 is used as an example. The device may further include an input apparatus 730 and an output apparatus 740.

The processor 710, the memory 720, the input apparatus 730 and the output apparatus 740 may be connected by a bus or in other manners. In FIG. 7, connection by the bus is used as an example.

The processor 710 may be a Central Processing Unit (CPU). The processor 710 may also be other general processors, a Digital Signal Processor (DSP), an Application Specific Integrated Circuit (ASIC), a Field-Programmable Gate Array (FPGA) or other chips such as programmable logic devices, discrete gate or transistor logic devices, and discrete hardware components, or a combination of the above chips. The general processors may be microprocessors or the processor may also be any conventional processors.

As a non-transient computer readable storage medium, the memory 720 includes a persistent memory, a volatile memory, and a hard disk, and may be configured to store a non-transient software program, a non-transient computer-executable program, and a module, for example, program instructions/modules corresponding to the service management method in the embodiments of the present disclosure. The processor 710 executes various functional applications and data processing of a server by running the non-transient software programs, the instructions and the modules stored in the memory 720, that is, implements any one of the configuration method for virtual network interface card resources.

The memory 720 may include a program storage area region and a data storage area. The program storage area may store an operating system and an application program required for at least one function. The data storage area may store data used according requirements. In addition, the memory 720 may include a high-speed random access memory (RAM), and may further include a non-transient memory, for example, at least one disk memory devices, a flash memory device, or other non-transient solid state memory devices. In some embodiments, the memory 720 may optionally include memories remotely disposed relative to the processor 710. These remote memories may be connected to a data processing apparatus via a network. Examples of the above network include, but are not limited to, the Internet, an intranet, a local area network, a mobile communication network, and a combination thereof.

The input apparatus 730 may be configured to receive inputted numbers or character information, and generate a key signal input related to user setting and function control. The output apparatus 740 may include other display devices such as a display screen.

One or more modules are stored in the memory 720, and, when being executed by one or more processors 710, execute the method shown in FIGS. 1-4.

The product may execute the method provided in any one or more embodiments of the present disclosure, and has the corresponding functional modules for executing the method and corresponding beneficial effects. Technical details not exhaustively described in this embodiment may specifically be found in the relevant descriptions in the embodiments shown in FIGS. 1-4, for example.

Figure 8:
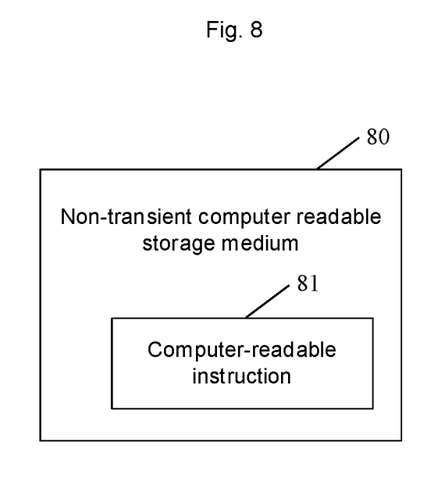
FIG. 8 is a schematic structural diagram of a non-transitory computer-readable storage medium according to one or more embodiments.

An embodiment of the present disclosure further provides a non-transient computer readable storage medium. Referring to FIG. 8, FIG. 8 is a schematic structural diagram of a non-transitory computer-readable storage medium according to one or more embodiments. The non-transient computer readable storage medium 80 stores a computer-readable instruction 81, and when the computer-readable instruction 81 is executed by one or more processors, the method in anyone or more method embodiments may be executed.

The storage medium may be a magnetic disk, an optical disk, an ROM, an RAM, a flash memory, an HDD, an SSD, or the like. The storage medium may further include a combination of memories of the above types.

Those of ordinary skill in the art may appreciate that implementing all or part of the processes in the methods described above may be accomplished by instructing associated hardware by a computer-readable instruction of a computer program. The computer-readable instruction of the computer program may be stored in a non-volatile computer-readable storage medium. The computer-readable instruction of the computer program may include processes as method embodiments described above when being executed. Any reference to a memory, storage, a database, or other media used in the embodiments provided in the present disclosure may include nonvolatile and/or volatile memories. The non-volatile memories may include a Read-Only Memory (ROM), a Programmable ROM (PROM), an Electrically Programmable ROM (EPROM), an Electrically Erasable and Programmable ROM (EEPROM), or a flash memory. The volatile memories may include a Random Access Memory (RAM), or an external cache memory. As not a limitation but an illustration, the RAM is available in many forms, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous Chain Channel (Synchlink) DRAM (SLDRAM), a Direct Memory Bus Dynamic RAM (DRDRAM), and a Memory Bus Dynamic RAM (RDRAM), among others.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

It is apparent that the above embodiments are merely examples for clear description, and are not intended to limit the implementations. For those of ordinary skill in the art, changes or modifications in other different forms may also be made on the basis of the above description. It is unnecessary and impossible to enumerate all the embodiments herein. The obvious changes or modifications derived from thereby are still within the protection scope of the present disclosure.

The invention claimed is:

1. A configuration method for virtual network interface card resource, comprising:

integrating a plurality of virtual network interface cards in a node where a container group is located, so as to obtain a virtual network interface card set comprising a plurality of virtual network interface card groups;

assigning a target virtual network interface card group for the container group from the virtual network interface card set;

analyzing the target virtual network interface card group, so as to obtain address information of target virtual network interface cards comprised in the target virtual network interface card group; and configuring a virtual network interface card resource for the container group according to the address information wherein integrating the plurality of virtual network interface cards in the node where the container group is located, so as to obtain the virtual network interface card set comprising the plurality of virtual network interface card groups comprises:

determining, based on physical network interface cards in the node where the container group is located, physical network interface card information comprised in the node where the container group is located;

virtualizing each physical network interface card corresponding to the physical network interface card information, so as to obtain a plurality of virtual network interface cards corresponding to each physical network interface card;

and integrating the virtual network interface cards, so as to obtain the virtual network interface card set comprising the plurality of virtual network interface card groups.

2. The method according to claim 1, wherein each virtual network interface card group comprises a plurality of virtual network interface cards.

3. The method according to claim 2, wherein different virtual network interface cards comprised in the same virtual network interface card group correspond to different physical network interface cards.

4. The method according to claim 1, wherein the target virtual network interface card group is any one of the virtual network interface card groups to be configured in the virtual network interface card set.

5. The method according to claim 1, wherein the number of the virtual network interface cards corresponding to each physical network interface card is the same.

6. The method according to claim 1, wherein integrating the virtual network interface cards comprises: integrating the physical network interface cards corresponding to the virtual network interface cards.

7. The method according to claim 1, wherein the physical network interface card information comprises the number of network interface cards of the physical network interface cards; and integrating the virtual network interface cards, so as to obtain the virtual network interface card set comprising the plurality of virtual network interface card groups comprises: determining the same number of network segments as the number of the physical network interface cards according to the number of network interface cards; establishing a correspondence relationship between the virtual network interface card and the network segment, wherein the network segments of the plurality of virtual network interface cards corresponding to the same physical network interface card are the same; and integrating the virtual network interface cards corresponding to different network segments into the same virtual network interface card group, so as to obtain the virtual network interface card set comprising the plurality of virtual network interface card groups.

8. The method according to claim 7, wherein the target virtual network interface card group comprises a plurality of target virtual network interface cards; and analyzing the target virtual network interface card group, so as to obtain the address information of the target virtual network interface cards comprised in the target virtual network interface card group comprises: analyzing the target virtual network interface card group, and determining the plurality of target virtual network interface cards comprised in the target virtual network interface card group; determining a target network segment corresponding to each target virtual network interface card according to the correspondence relationship between the virtual network interface card and the network segment; and obtaining the address information of each target virtual network interface card comprised in the target virtual network interface card group according to each target virtual network interface card and the target network segment corresponding to each target virtual network interface card.

9. The method according to claim 1, wherein configuring the virtual network interface card resource for the container group according to the address information comprises:
respectively constructing network proxy configuration for each target virtual network interface card according to the address information; and configuring the virtual network interface card resource for the container group according to the network proxy configuration.

10. The method according to claim 1, wherein analyzing the target virtual network interface card group comprises:
analyzing the target virtual network interface card group by a multi-container network interface component in the node.

11. The method according to claim 1, further comprising: creating and storing an identifier of each virtual network interface card group, so as to determine, through the identifier, the target virtual network interface card group to be assigned.

12. The method according to claim 11, wherein different numbers are used as identifiers of different virtual container groups.

13. The method according to claim 1, wherein assigning the target virtual network interface card group for the container group from the virtual network interface card set comprises:
determining a virtual network interface card resource requirement of the container group according to a preset configuration file of the container group; and
assigning the target virtual network interface card group for the container group from the virtual network interface card set according to the virtual network interface card resource requirement.

14. The method according to claim 1, wherein the method is used for performing deep learning training in a kubernetes cluster.

15. The method according to claim 1, further comprising: constructing an environment variable of the container group, wherein the environment variable is used for configuring communication environments of a plurality of Graphics Processing Units (GPU) for a plurality of target virtual network interface cards.

16. The method according to claim 15, wherein the number of constructed communication environments of the GPUs is the same as the number of the target virtual network interface cards.

17. The method according to claim 1, wherein configuring a virtual network interface card resource for the container group according to the address information comprises:
configuring the virtual network interface card resource for the container group according to the address information at the underlying level of the node.

18. A computer device, comprising a memory, and one or more processors, wherein the memory stores a computer-readable instruction; and when the computer-readable instruction is executed by the one or more processors, the one or more processors are enabled to execute the following operations:
integrate a plurality of virtual network interface cards in a node where a container group is located, so as to obtain a virtual network interface card set comprising a plurality of virtual network interface card groups;
assign a target virtual network interface card group for the container group from the virtual network interface card set;
analyze the target virtual network interface card group, so as to obtain address information of target virtual network interface cards comprised in the target virtual network interface card group; and
configure a virtual network interface card resource for the container group according to the address information
wherein integrate the plurality of virtual network interface cards in the node where the container group is located, so as to obtain the virtual network interface card set comprising the plurality of virtual network interface card groups comprises:
determining, based on physical network interface cards in the node where the container group is located, physical network interface card information comprised in the node where the container group is located; virtualizing each physical network interface card corresponding to the physical network interface card information, so as to obtain a plurality of virtual network interface cards corresponding to each physical network interface card; and integrating the virtual network interface cards, so as to obtain the virtual network interface card set comprising the plurality of virtual network interface card groups.

19. One or more non-transitory computer-readable storage media, storing a computer-readable instruction, wherein, when the computer-readable instruction is executed by one or more processors, the one or more processors are enabled to execute the following operations:
integrate a plurality of virtual network interface cards in a node where a container group is located, so as to obtain a virtual network interface card set comprising a plurality of virtual network interface card groups;
assign a target virtual network interface card group for the container group from the virtual network interface card set;
analyze the target virtual network interface card group, so as to obtain address information of target network interface cards comprised in the target virtual network interface card group; and
configure a virtual network interface card resource for the container group according to the address information
wherein integrate the plurality of virtual network interface cards in the node where the container group is located, so as to obtain the virtual network interface card set comprising the plurality of virtual network interface card groups comprises:
determining, based on physical network interface cards in the node where the container group is located, physical network interface card information comprised in the node where the container group is located; virtualizing each physical network interface card corresponding to the physical network interface card information, so as to obtain a plurality of virtual network interface cards corresponding to each physical network interface card; and integrating the virtual network interface cards, so as to obtain the virtual network interface card set comprising the plurality of virtual network interface card groups.

\* \* \* \* \*